US010189516B1

(12) United States Patent
Sylvester et al.

(10) Patent No.: US 10,189,516 B1
(45) Date of Patent: Jan. 29, 2019

(54) VEHICLE AERODYNAMIC ASSEMBLIES FOR PROVIDING PASSIVE WATER MANAGEMENT

(71) Applicant: FORD GLOBAL TECHNOLOGIES, LLC, Dearborn, MI (US)

(72) Inventors: Michael Stephen Sylvester, Berkley, MI (US); Andrew Thomas Cunningham, Royal Oak, MI (US); Matthew Arthur Titus, Livonia, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 0 days.

(21) Appl. No.: 15/647,358

(22) Filed: Jul. 12, 2017

(51) Int. Cl.
*B62D 35/00* (2006.01)
*B62D 25/12* (2006.01)

(52) U.S. Cl.
CPC .......... *B62D 35/007* (2013.01); *B62D 25/12* (2013.01)

(58) Field of Classification Search
CPC .... B62D 35/00; B62D 35/005; B62D 35/007; B62D 35/02; B62D 37/00
USPC .............................. 296/180.1–180.5; 180/903
See application file for complete search history.

(56) References Cited

U.S. PATENT DOCUMENTS

| | | | | |
|---|---|---|---|---|
| 4,900,080 A | * | 2/1990 | Morris, II | B60P 7/02 296/100.06 |
| 6,068,328 A | * | 5/2000 | Gazdzinski | B62D 35/00 244/203 |
| 7,052,074 B2 | * | 5/2006 | Dringenberg | B62D 35/007 296/180.5 |
| 7,815,250 B2 | * | 10/2010 | Oshio | B60K 13/04 293/113 |
| 2013/0026797 A1 | * | 1/2013 | Onodera | B62D 35/02 296/204 |
| 2013/0181476 A1 | * | 7/2013 | Naoi | B62D 25/10 296/180.1 |

FOREIGN PATENT DOCUMENTS

| | | | |
|---|---|---|---|
| CN | 202463952 U | 10/2012 | |
| DE | 2819239 | * 11/1979 | .......... B62D 35/007 |
| JP | S6082487 A | 5/1985 | |
| JP | S6237286 A | 2/1987 | |
| JP | H08150962 A | 6/1996 | |
| KR | 0128149 B1 | 4/1998 | |
| KR | 100262080 B1 | 7/2000 | |

* cited by examiner

*Primary Examiner* — Dennis H Pedder
(74) *Attorney, Agent, or Firm* — Carlson, Gaskey & Olds (57) ABSTRACT

A vehicle aerodynamic assembly includes a first end plate, an airfoil including an outboard edge portion contiguous with the first end plate, and a first drainage channel extending through at least one of the first end plate and the outboard edge portion of the airfoil. The aerodynamic assembly may be mounted to a deck lid of a vehicle.

19 Claims, 8 Drawing Sheets

VEHICLE AERODYNAMIC ASSEMBLIES FOR PROVIDING PASSIVE WATER MANAGEMENT

TECHNICAL FIELD

This disclosure relates to vehicle aerodynamic assemblies. An exemplary vehicle aerodynamic assembly includes one or more drainage channels for passively managing water that may accumulate on the vehicle aerodynamic assembly.

BACKGROUND

Vehicle aerodynamic assemblies, such as rear wings and rear spoilers, have become increasingly desirable for use on street legal passenger vehicles because of their aerodynamic and aesthetically pleasing qualities. Water may accumulate on a surface of an airfoil of the aerodynamic assembly during rainfall events or car wash events. If not managed, the water can degrade the surface finish of the aerodynamic assembly, cause mold/mildew, reduce aesthetics, etc. This can ultimately lead to customer dissatisfaction.

SUMMARY

A vehicle aerodynamic assembly according to an exemplary aspect of the present disclosure includes, among other things, a first end plate, an airfoil including an outboard edge portion contiguous with the first end plate, and a first drainage channel extending through at least one of the first end plate and the outboard edge portion of the airfoil.

In a further non-limiting embodiment of the foregoing assembly, a second end plate is connected to an opposing outboard edge portion of the airfoil.

In a further non-limiting embodiment of either of the foregoing assemblies, a second drainage channel extends through at least one of the second end plate and the opposing outboard edge portion of the airfoil.

In a further non-limiting embodiment of any of the foregoing assemblies, the airfoil includes a downward slope that is sloped at an angle between an apex of the airfoil and the outboard edge portion of the airfoil.

In a further non-limiting embodiment of any of the foregoing assemblies, the angle of the downward slope is greater than 0° and less than or equal to about 15°.

In a further non-limiting embodiment of any of the foregoing assemblies, the first drainage channel is formed through the outboard edge portion of the airfoil and extends from a top surface to a bottom surface of the airfoil.

In a further non-limiting embodiment of any of the foregoing assemblies, the first drainage channel is formed through the first end plate and includes an inlet adjacent to a top surface of the airfoil and an outlet adjacent to a bottom surface of the airfoil.

In a further non-limiting embodiment of any of the foregoing assemblies, the outlet is wider than the inlet.

In a further non-limiting embodiment of any of the foregoing assemblies, a plurality of drainage channels are formed through the airfoil, the first end plate, or both.

In a further non-limiting embodiment of any of the foregoing assemblies, the first drainage channel is one of a plurality of channels that are disposed in at least a first row and a second row of drainage channels.

A vehicle according to another exemplary aspect of the present disclosure includes, among other things, a deck lid and an aerodynamic assembly mounted to the deck lid and including a first end plate, a second end plate, an airfoil extending between the first end plate and the second end plate, and a first drainage channel located at a junction between the first end plate and the airfoil.

In a further non-limiting embodiment of the foregoing vehicle, the aerodynamic assembly is a wing assembly.

In a further non-limiting embodiment of either of the foregoing vehicles, the aerodynamic assembly is a spoiler assembly.

In a further non-limiting embodiment of any of the foregoing vehicles, the first drainage channel is formed through an outboard edge portion of the airfoil at the junction between the first end plate and the airfoil.

In a further non-limiting embodiment of any of the foregoing vehicles, the first drainage channel is formed through the first end plate.

In a further non-limiting embodiment of any of the foregoing vehicles, a second drainage channel is located at a junction between the second end plate and the airfoil.

In a further non-limiting embodiment of any of the foregoing vehicles, the second drainage channel is formed through an outboard edge portion of the airfoil at the junction between the second end plate and the airfoil.

In a further non-limiting embodiment of any of the foregoing vehicles, the second drainage channel is formed through the second end plate.

In a further non-limiting embodiment of any of the foregoing vehicles, the first drainage channel extends through the airfoil, and a second drainage channel extends through the first end plate.

In a further non-limiting embodiment of any of the foregoing vehicles, the airfoil includes a downward slope in a plane that extends along a longitudinal axis of the airfoil.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details vehicle aerodynamic assemblies that provide passive water management. An exemplary vehicle aerodynamic assembly includes an end plate, an airfoil including an outboard edge portion that is contiguous with the end plate, and a drainage channel extending through at least one of the end plate and the airfoil. The drainage channel allows water that has collected on top of the airfoil to escape to the underside of the airfoil. These and other features of this disclosure are described in greater detail below.

Figure 1:
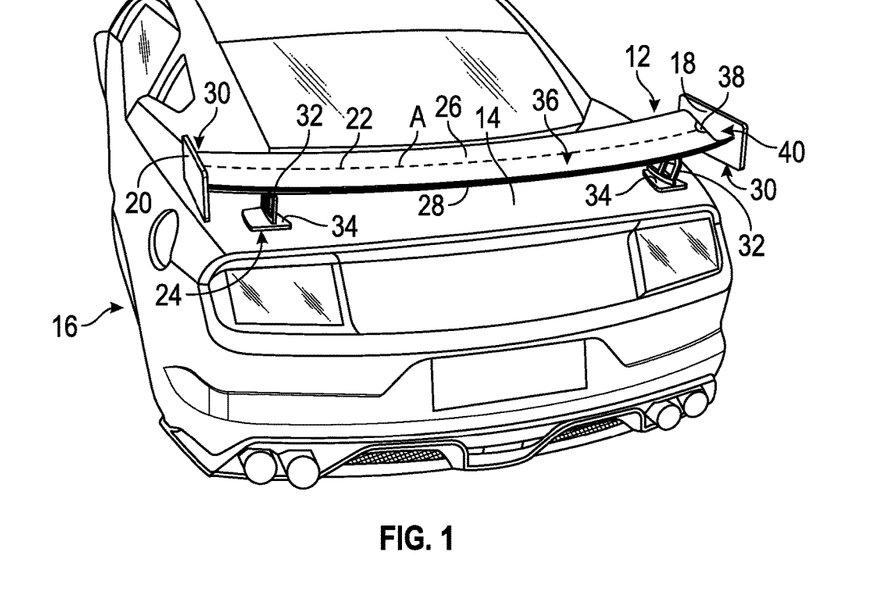
FIG. 1 illustrates a vehicle equipped with an aerodynamic assembly.

FIG. 1 schematically illustrates portions of a vehicle 10. The vehicle 10 may be a car, a truck, a van, a sport utility vehicle, or any other type of vehicle. The vehicle 10 could also be a conventional motor vehicle, a battery powered hybrid or electric vehicle, or an autonomous vehicle (i.e., a driverless vehicle).

Although a specific component relationship is illustrated in the figures of this disclosure, the illustrations are not intended to limit this disclosure. The placement and orientation of the various components of the vehicle 10 are shown schematically and could vary within the scope of this disclosure. In addition, the various figures accompanying this disclosure are not necessarily to scale, and some features may be exaggerated or minimized to show certain details of a particular component.

The vehicle 10 is equipped with an aerodynamic assembly 12. The aerodynamic assembly 12 is mounted to a deck lid 14 located at an exterior rear portion 16 of the vehicle 10. The aerodynamic assembly 12 may therefore be referred to as a rear aerodynamic assembly. Although a rear aerodynamic assembly is described herein, aerodynamic assemblies positioned at other vehicle locations (i.e., exterior front portion, roof, etc.) could be similarly configured.

In a first embodiment, the aerodynamic assembly 12 is a wing assembly. In a second embodiment, the aerodynamic assembly 12 is a spoiler assembly. As is understood in this field of technology, wing assemblies are devices designed to generate downforce primarily via decreasing pressure on the bottom side of the device as air is accelerated on that surface and by increasing pressure on the upper surface, whereas spoiler assemblies are devices designed to generate downforce via primarily increasing pressure on the top side of the device or reducing drag by promoting a less-turbulent separation from the vehicle body.

Figure 2:
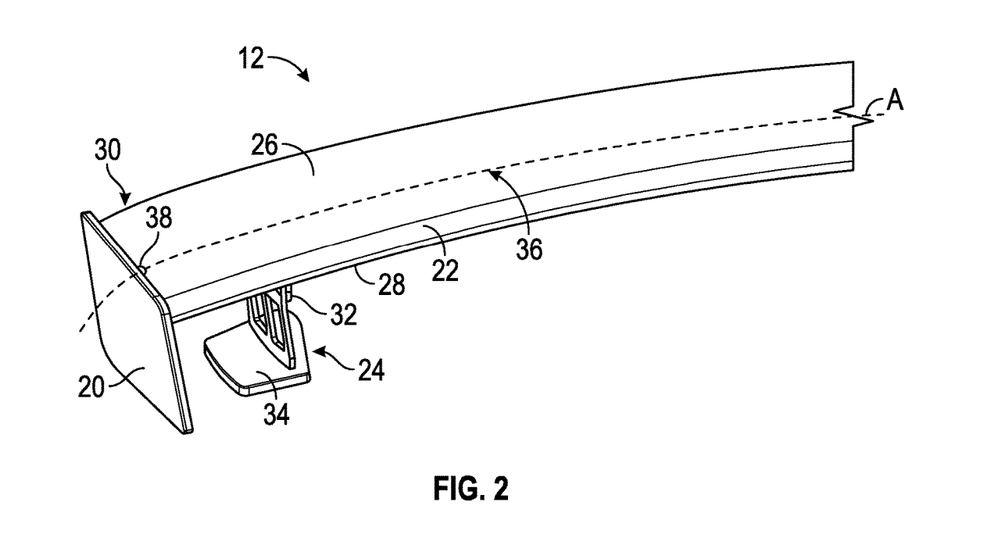
FIG. 2 illustrates an exemplary aerodynamic assembly.
Figure 3:
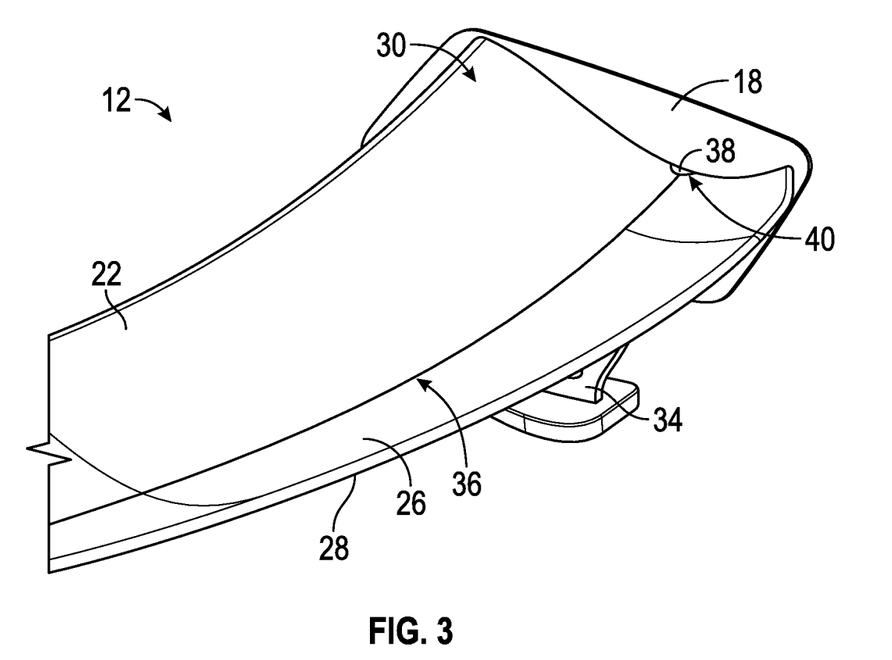
FIG. 3 illustrates a valley of an airfoil of the aerodynamic assembly of FIG. 2.

Referring now to FIGS. 1-3, the aerodynamic assembly 12 may include a first end plate 18, a second end plate 20, one or more airfoils 22, and a mounting system 24. The airfoil 22 extends along a longitudinal axis A between the first end plate 18 and the second end plate 20. The first end plate 18 and the second end plate 20 are positioned at opposing outboard edge portions 30 of the airfoil 22. Each outboard edge portion 30 is therefore in direct contact with (i.e., contiguous with) either the first end plate 18 or the second end plate 20. The first end plate 18 and the second end plate 20 can be secured to the airfoil 22 using known attachment techniques, including but not limited to, mechanical fastening techniques and welding techniques. In an embodiment, a positioning of the airfoil 22 is adjustable between two or more positions relative to the first and second end plates 18, 20 to adjust an angle of attack of the airfoil 22 relative to oncoming airflow.

In another embodiment, the first end plate 18 and the second end plate 20 are generally flat, rectangular structures that extend perpendicularly relative to the longitudinal axis A of the airfoil 22. Portions of each of the first end plate 18 and the second end plate 20 extend both above and below the airfoil 22. The size and shape of the first and second end plates 18, 20 are not intended to limit this disclosure.

The airfoil 22 includes a top surface 26 that faces away from the deck lid 14 and a bottom surface 28 that faces toward the deck lid 14. The airfoil 22 may include any airfoil shape. The actual shape of the airfoil 22 is also not intended to limit this disclosure. In addition, although shown with a single airfoil 22, the aerodynamic assembly 12 could include multiple airfoils within the scope of this disclosure.

The aerodynamic assembly 12 is mounted to the deck lid 14 using the mounting system 24. In an embodiment, the mounting system 24 includes a bracket 32 that extends from the bottom surface 28 of the airfoil 22 and a stanchion 34 secured to the deck lid 14 and extending upwardly therefrom. The bracket 32 may be fixedly secured to the stanchion 34 in any known manner to mount the aerodynamic assembly 12 to the deck lid 14 of the vehicle 10. In an embodiment, the mounting system 24 includes two brackets 32 and two stanchions 34 (best shown in FIG. 1).

The top surface 26 of the airfoil 22 of the aerodynamic assembly 12 includes a valley 36. The valley 36 extends along the top surface 26 between the first end plate 18 and the second end plate 20. In an embodiment, the valley 36 extends across the entire length of the airfoil 22 along the top surface 26. The valley 36 represents the low point of the top surface 26 at each axial point of the length of the airfoil 22.

Figure 4:
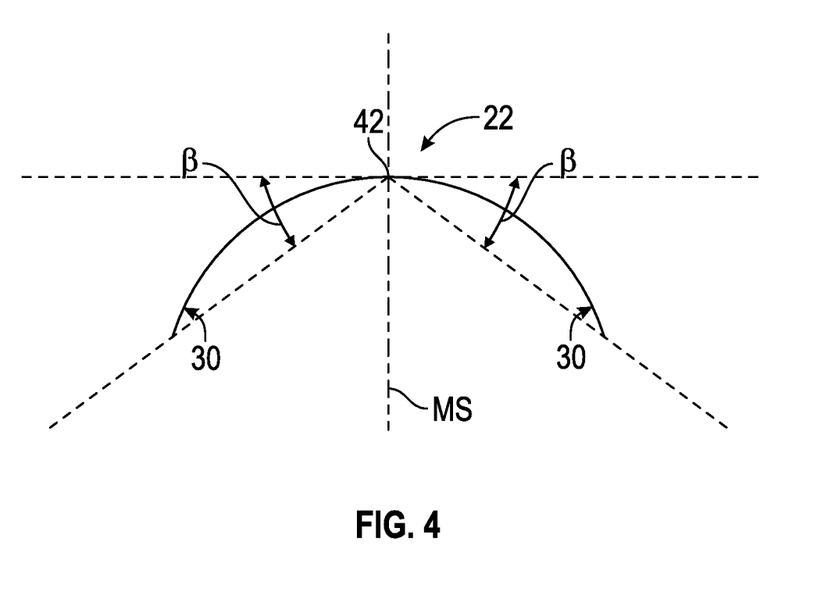
FIG. 4 illustrates an airfoil of the aerodynamic assembly of FIG. 2.

FIG. 4, with continued reference to FIGS. 1-3, illustrates a cross-sectional slice of the airfoil 22 as viewed along a plane that extends in parallel with the longitudinal axis A of the airfoil 22 between the outboard edge portions 30. In this longitudinal plane, the airfoil 22 includes a downward slope that curves in a direction toward the deck lid 14. The airfoil 22 therefore includes a convex shape when viewed from either the front or rear of the aerodynamic assembly 12.

The downward slope is configured such that an apex 42 of the airfoil 22 is located near its mid-span MS. The mid-span MS is generally located halfway between the opposing outboard edge portions 30 of the airfoil 22. In an embodiment, the airfoil 22 is sloped at an angle $\beta$ between the apex 42 and each outboard edge portion 30 of the airfoil 22 to provide the downward slope. The angle $\beta$ may be a continuous angle. In an embodiment, the angle $\beta$ is an angle greater than 0° and less than or equal to about 15°.

The downward slope defined by the airfoil 22 creates a low point 40 (see, e.g., FIG. 3) in the valley 36 at each opposing outboard edge portion 30 of the airfoil 22. The outboard edge portions 30 are therefore slightly closer to the deck lid 14 than the apex 42.

Water may accumulate within the valley 36 of the airfoil 22, particularly at the low points 40, during rainfall events or car wash events. The aerodynamic assembly 12 may therefore include a water management system for passively managing water that accumulates in the valley 36. For example, the aerodynamic assembly 12 may include one or more drainage channels 38 that permit water to pass from the top surface 26 of the airfoil 22 to the bottom surface 28. Once at the bottom surface 28, the water can drain onto the deck lid 14 by virtue of gravity and then flow away from the vehicle 10.

Figure 5:
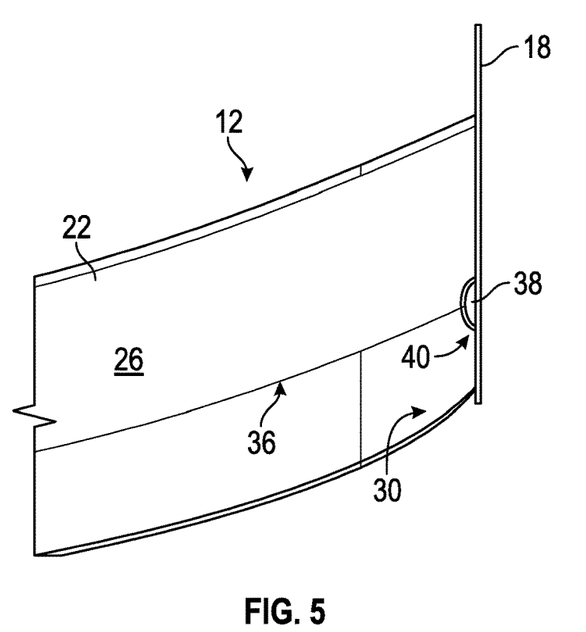
FIGS. 5 and 6 illustrate a water drainage system of a vehicle aerodynamic assembly according to a first embodiment of this disclosure.
Figure 6:
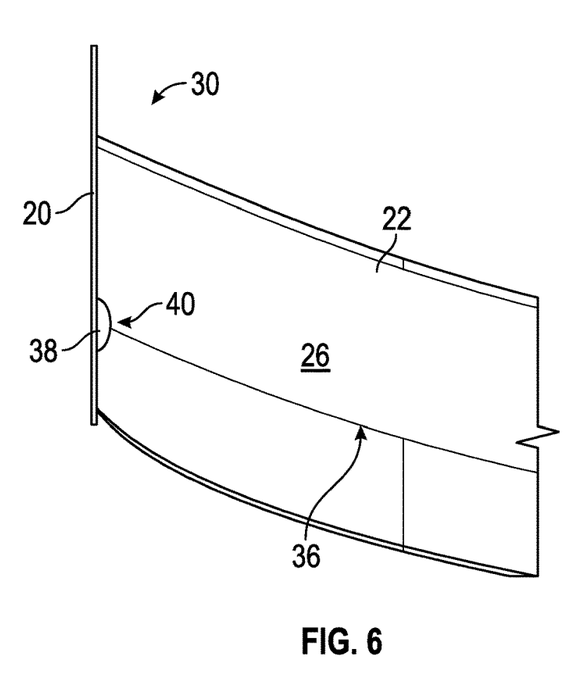

An exemplary water drainage system of the aerodynamic assembly 12 is illustrated in FIGS. 5 and 6. In this embodiment, the water drainage system includes a first drainage channel 38 (see FIG. 5) formed through the airfoil 22. The first drainage channel 38 may be formed at a junction between the outboard edge portion 30 of the airfoil 22 and the first end plate 18. Positioning the drainage channel 38 at this outboard location minimizes any detrimental impact on aerodynamics or aesthetics. In another embodiment, a second drainage channel 38 is formed at a junction between the outboard edge portion 30 of the airfoil 22 and the second end plate 20 (see FIG. 6).

The first and second drainage channels 38 are positioned at or near the low points 40 of the valley 36 and may extend from the top surface 26 to the bottom surface 28 of the airfoil 22. Water may accumulate at the low points 40 by virtue of gravity because of the downward slope of the airfoil 22. The drainage channels 38 provide a path for water that accumulates in the valley 36 to drain away from the aerodynamic assembly 12.

Figure 7:
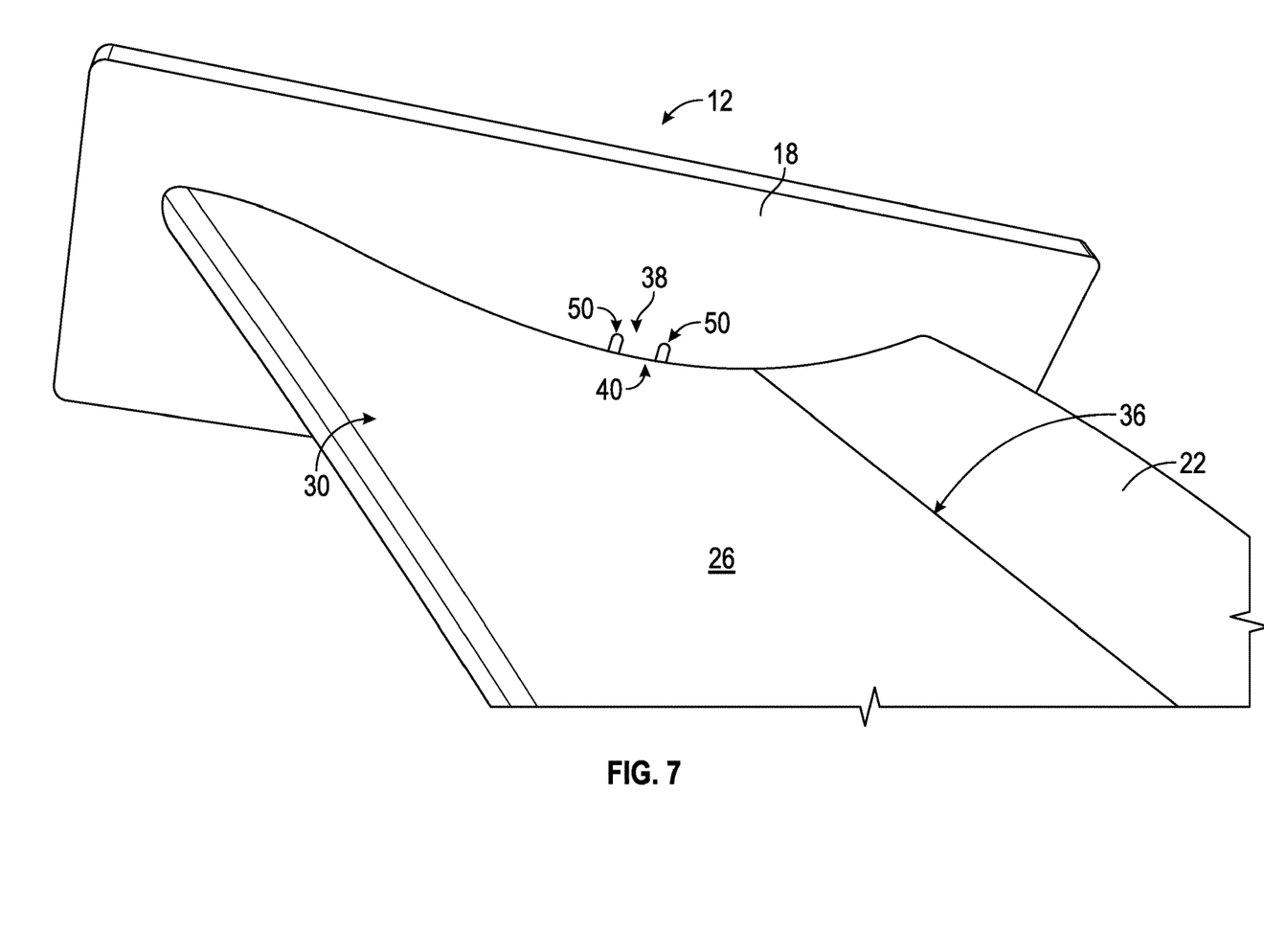
FIGS. 7, 8, and 9 illustrate a water drainage system for a vehicle aerodynamic assembly according to a second embodiment of this disclosure.
Figure 8:
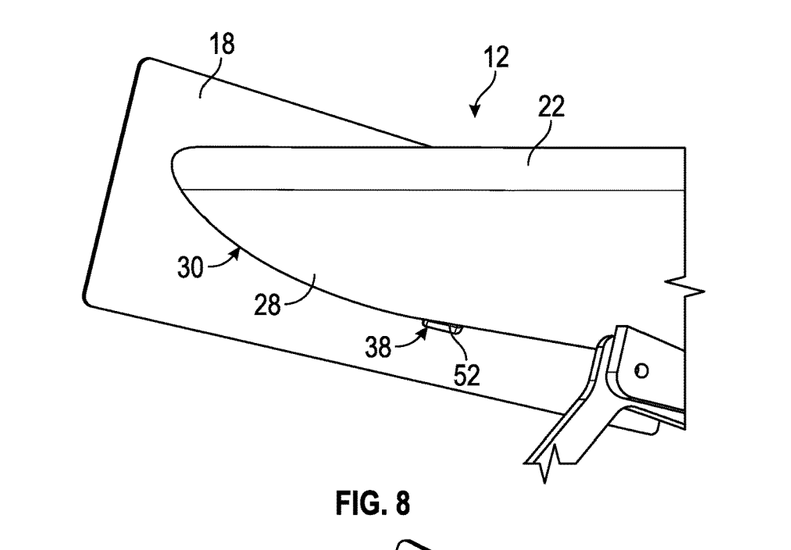
Figure 9:
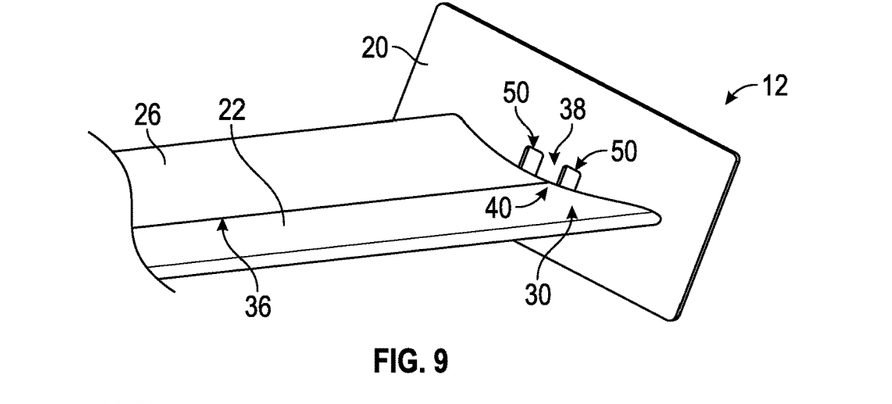

Another exemplary water drainage system of the aerodynamic assembly 12 is illustrated in FIGS. 7-9. In this embodiment, the water drainage system includes a first drainage channel 38 formed near a junction between the outboard edge portion 30 of the airfoil 22 and the first end plate 18. The first drainage channel 38 of this embodiment is formed in the first end plate 18 (see FIGS. 7-8) of the aerodynamic assembly 12 as opposed to being formed in the airfoil 22. In another embodiment, a second drainage channel 38 is formed in the second end plate 20 at a junction between the outboard edge portion 30 of the airfoil 22 and the second end plate 20 (see FIG. 9).

Figure 10:
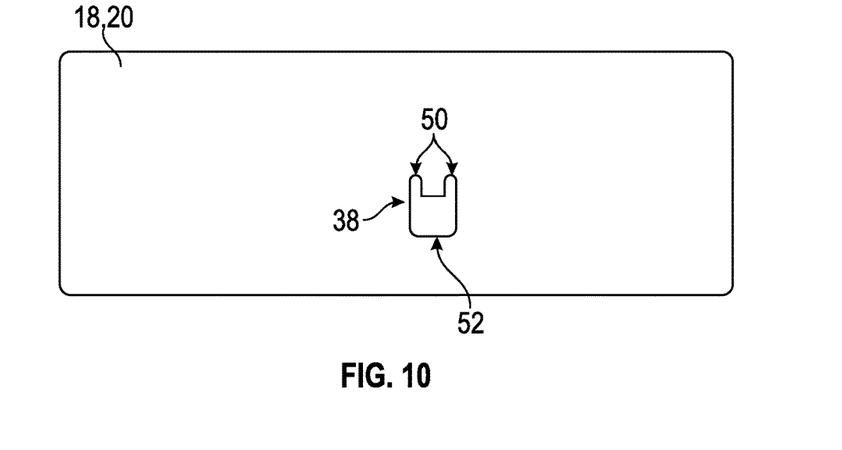
FIG. 10 illustrates an exemplary drainage channel of the water drainage system of FIGS. 7-9.

The first and second drainage channels 38 are formed through the first and second end plates 18, 20 at or near the low points 40 of the valley 36. In an embodiment, the drainage channels 38 are openings formed in the end plates 18, 20 that each include at least one inlet 50 and outlet 52. In another embodiment, each drainage channel 38 includes two inlets 50. At least one of the inlets 50 can be positioned at the low point 40 for each positioning of the airfoil 22. The outlet 52 may include a larger width than the inlets 50 (see, e.g., FIG. 10).

The inlets 50 extend above the top surface 26 of the airfoil 22, whereas the outlets 52 extend below the bottom surface 28 of the airfoil 22. Water may accumulate at the low points 40 by virtue of gravity because of the downward slope of the airfoil 22. Water that has accumulated at the low points 40 may enter the inlets 50 at the top surface 26 and exit the drainage channel 38 through the outlet 52 at the bottom surface 28. The drainage channels 38 thus provide a path for water that accumulates in the valley 36 to drain away from the aerodynamic assembly 12.

Figure 11:
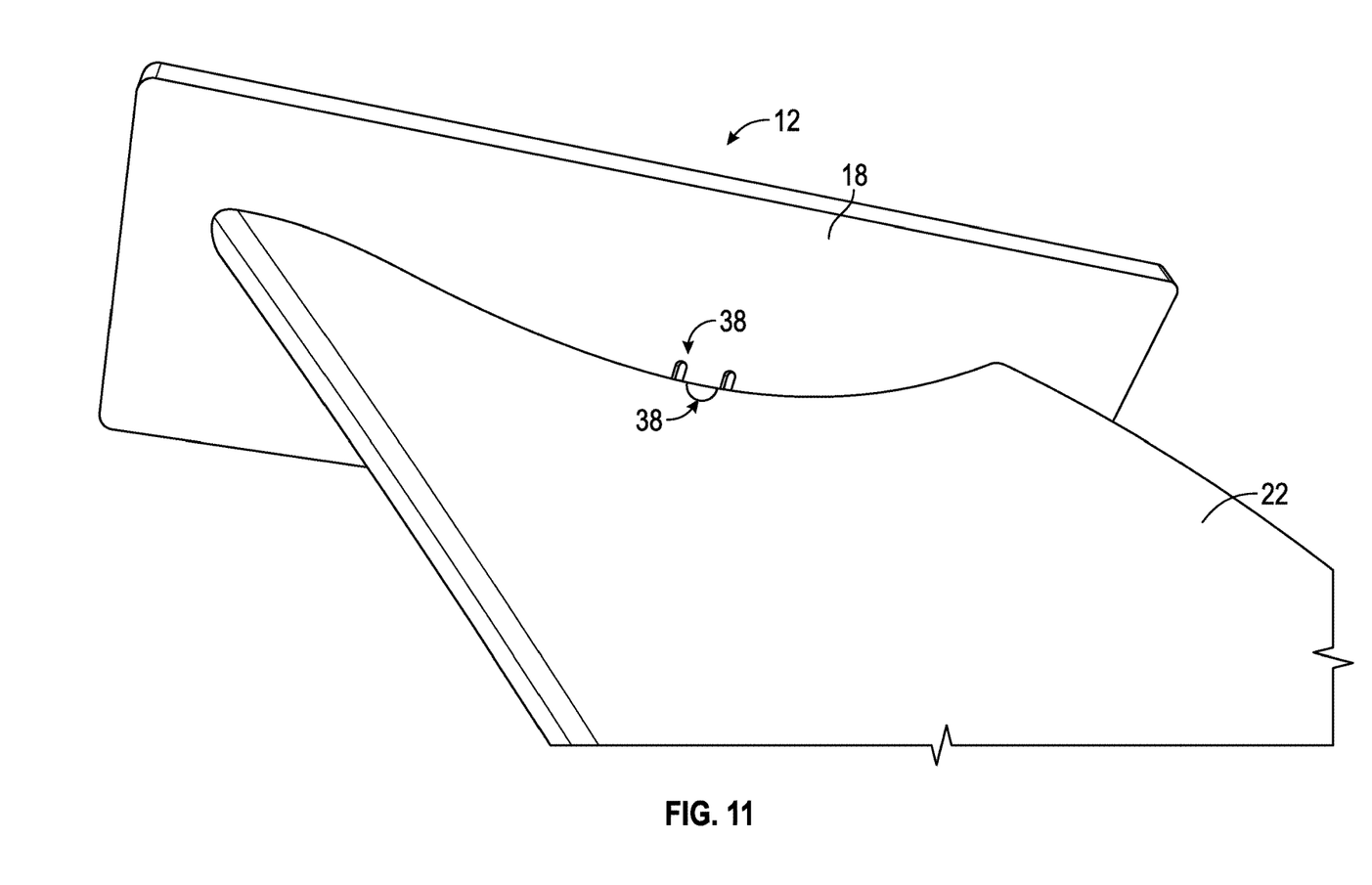
FIG. 11 illustrates a water drainage system for a vehicle aerodynamic assembly according to a third embodiment of this disclosure.

Yet another exemplary water drainage system of the aerodynamic assembly 12 is illustrated in FIG. 11. In this embodiment, one or more drainage channels 38 are formed in both the airfoil 22 and the end plates 18, 20 (only the first end plate 18 shown in FIG. 11).

Figure 12:
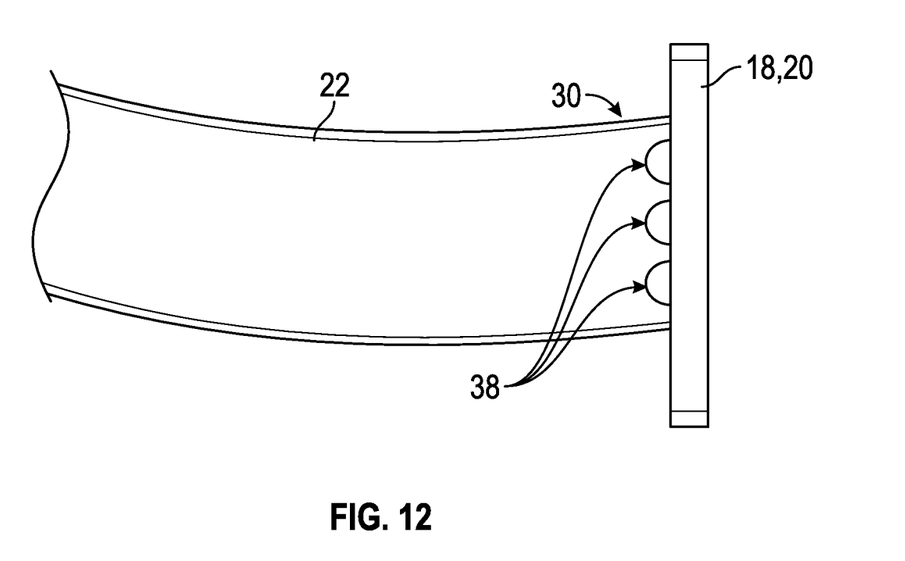
FIG. 12 illustrates a water drainage system for a vehicle aerodynamic assembly according to a fourth embodiment of this disclosure.
Figure 13:
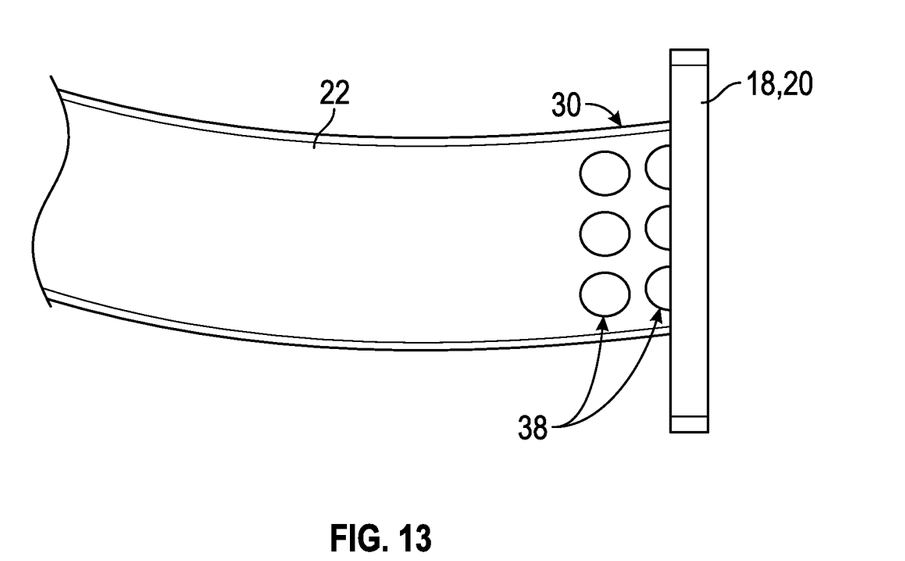
FIG. 13 illustrates a water drainage system for a vehicle aerodynamic assembly according to a fifth embodiment of this disclosure.

The drainage channels 38 can be provided in various configurations. For example, as described above, a single drainage channel 38 can be provided at the junctions between the airfoil 22 and each end plate 18, 20 (see, e.g., FIGS. 5-9). In another embodiment, multiple drainage channels 38 can be provided at each junction (see, e.g., FIG. 12). In yet another embodiment, a plurality of drainage channels 38 are formed in one or more rows at the junction between each outboard edge portion 30 and each end plate 18, 20 (see, e.g., FIG. 13).

Figure 14:
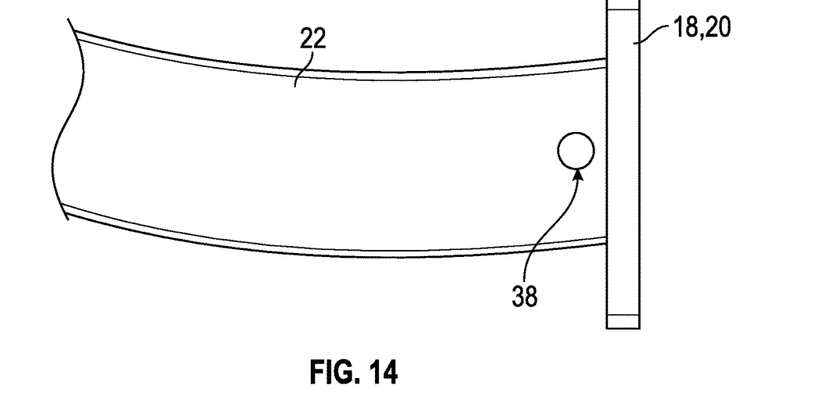
FIG. 14 illustrates an exemplary drainage channel of a water drainage system.
Figure 15:
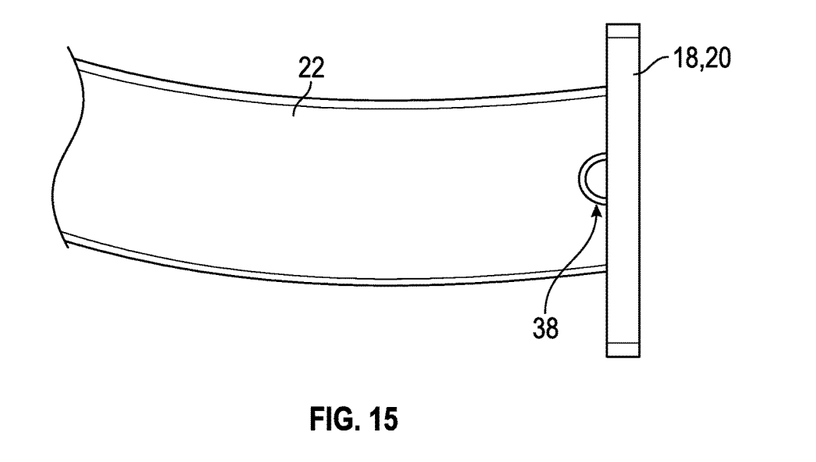
FIG. 15 illustrates another exemplary drainage channel of a water drainage system.
Figure 16:
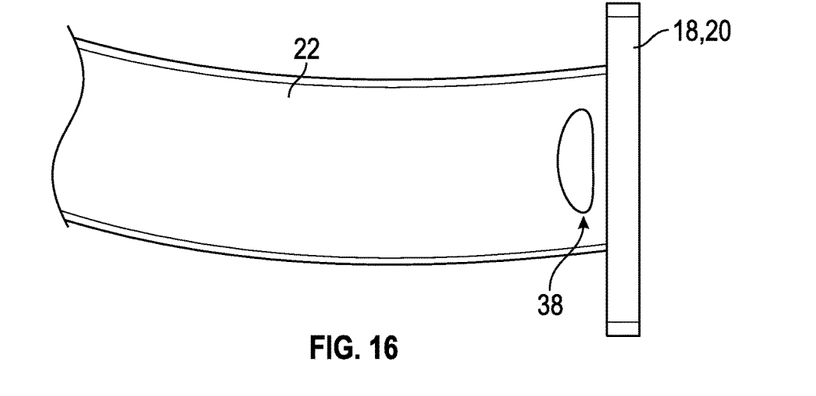
FIG. 16 illustrates yet another exemplary drainage channel of a water drainage system.

The drainage channels 38 can also embody various sizes and shapes. By way of non-limiting examples, the drainage channels 38 could include a round shape (see, e.g., FIG. 14), a curved shape (see, e.g., FIG. 15), an oblong shape (see, e.g., FIG. 16), etc. Other shapes are also contemplated within the scope of this disclosure.

The aerodynamic assemblies of this disclosure include one or more drainage channels designed for passively managing water that accumulates on top surfaces of airfoils of the assemblies. The drainage channels allow the water to pass to an underside of each assembly. Due to their placement at the outboard edge portions of the assemblies, the drainage channels do not detrimentally impact aerodynamics or aesthetics.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A vehicle aerodynamic assembly, comprising:
   a first end plate;
   an airfoil including an outboard edge portion contiguous with the first end plate, wherein a first portion of the first end plate extends above the airfoil and a second portion of the first end plate extends below the airfoil;
   a second end plate connected to an opposing outboard edge portion of the airfoil; and
   a first drainage channel extending through at least one of the first end plate and the outboard edge portion of the airfoil.

2. The assembly as recited in claim 1, comprising a second drainage channel extending through at least one of the second end plate and the opposing outboard edge portion of the airfoil.

3. The assembly as recited in claim 1, wherein the airfoil includes a downward slope that is sloped at an angle between an apex of the airfoil and the outboard edge portion of the airfoil.

4. The assembly as recited in claim 3, wherein the angle of the downward slope is greater than 0° and less than or equal to about 15°.

5. The assembly as recited in claim 1, wherein the first drainage channel is formed through the outboard edge portion of the airfoil and extends from a top surface to a bottom surface of the airfoil.

6. A vehicle aerodynamic assembly, comprising:
a first end plate;
an airfoil including an outboard edge portion contiguous with the first end plate; and
a first drainage channel extending through at least one of the first end plate and the outboard edge portion of the airfoil,
wherein the first drainage channel is formed through the first end plate and includes an inlet adjacent to a top surface of the airfoil and an outlet adjacent to a bottom surface of the airfoil.

7. The assembly as recited in claim 6, wherein the outlet is wider than the inlet.

8. The assembly as recited in claim 1, comprising a plurality of drainage channels formed through the airfoil, the first end plate, or both.

9. The assembly as recited in claim 1, wherein the first drainage channel is one of a plurality of channels that are disposed in at least a first row and a second row of drainage channels.

10. A vehicle, comprising:
a deck lid;
an aerodynamic assembly mounted to the deck lid and including:
a first end plate;
a second end plate;
an airfoil extending between the first and second end plates; and
a first drainage channel located at a junction between the first end plate and the airfoil; and
a mounting system including:
a stanchion mounted to the deck lid; and
a bracket mounted to the stanchion and the airfoil.

11. The vehicle as recited in claim 10, wherein the aerodynamic assembly is a wing assembly.

12. The vehicle as recited in claim 10, wherein the aerodynamic assembly is a spoiler assembly.

13. The vehicle as recited in claim 10, wherein the first drainage channel is formed through an outboard edge portion of the airfoil at the junction between the first end plate and the airfoil.

14. A vehicle, comprising:
a deck lid; and
an aerodynamic assembly mounted to the deck lid and including:
a first end plate;
a second end plate;
an airfoil extending between the first end plate and the second end plate; and
a first drainage channel located at a junction between the first end plate and the airfoil,
wherein the first drainage channel is formed through the first end plate.

15. The vehicle as recited in claim 10, comprising a second drainage channel located at a junction between the second end plate and the airfoil.

16. The vehicle as recited in claim 15, wherein the second drainage channel is formed through an outboard edge portion of the airfoil at the junction between the second end plate and the airfoil.

17. The vehicle as recited in claim 15, wherein the second drainage channel is formed through the second end plate.

18. A vehicle, comprising:
a deck lid; and
an aerodynamic assembly mounted to the deck lid and including:
a first end plate;
a second end plate;
an airfoil extending between the first end plate and the second end plate; and
a first drainage channel located at a junction between the first end plate and the airfoil,
wherein the first drainage channel extends through the airfoil, and a second drainage channel extends through the first end plate.

19. The vehicle as recited in claim 10, wherein the airfoil includes a downward slope in a plane that extends along a longitudinal axis of the airfoil.

* * * * *